(12) United States Patent
Klein et al.

(10) Patent No.: US 10,874,050 B2
(45) Date of Patent: Dec. 29, 2020

(54) CHOPPING BLADE FOR A STRAW CHOPPER

(71) Applicant: Deere & Company, Moline, IL (US)

(72) Inventors: Oliver Klein, Saarwellingen (DE); Martin Bueermann, Beckingen (DE); Dirk Weichholdt, Woelfling les Sarreguemin (FR)

(73) Assignee: Deere & Company, Moline, IL (US)

( * ) Notice: Subject to any disclaimer, the term of this patent is extended or adjusted under 35 U.S.C. 154(b) by 62 days.

(21) Appl. No.: 16/021,336

(22) Filed: Jun. 28, 2018

(65) Prior Publication Data
US 2019/0000018 A1  Jan. 3, 2019

(30) Foreign Application Priority Data
Jun. 28, 2017  (DE) .................. 10 2017 210 945

(51) Int. Cl.
| | |
|---|---|
| A01D 34/73 | (2006.01) |
| A01F 12/40 | (2006.01) |
| A01F 29/02 | (2006.01) |
| A01D 41/12 | (2006.01) |
| A01F 29/09 | (2010.01) |

(52) U.S. Cl.
CPC ............ A01D 34/736 (2013.01); A01F 12/40 (2013.01); A01F 29/02 (2013.01); *A01D 41/12* (2013.01); *A01F 29/095* (2013.01)

(58) Field of Classification Search
CPC ........ A01F 12/40; A01F 29/01; A01F 29/005; A01F 29/02; A01F 29/04; A01D 34/736; A01D 34/73; A01D 34/52; A01D 34/535

USPC .......................................................... 30/276
See application file for complete search history.

(56) References Cited

U.S. PATENT DOCUMENTS

| 513,834 | A | * | 1/1894 | Smith ................ | A01D 34/13 56/299 |
|---|---|---|---|---|---|
| 2,924,059 | A | * | 2/1960 | Beeston, Jr. ........ | A01D 34/73 56/295 |
| 3,340,682 | A | * | 9/1967 | Ely .................... | A01D 34/73 56/295 |
| 3,343,351 | A | * | 9/1967 | Freedlander ........ | A01D 34/63 56/295 |
| 3,444,675 | A | * | 5/1969 | Freedlander ........ | A01D 34/73 56/295 |
| 3,540,198 | A | * | 11/1970 | Erickson ............. | A01D 34/404 56/295 |

(Continued)

FOREIGN PATENT DOCUMENTS

| AT | 304121 B | * | 12/1972 | .......... A01D 34/736 |
|---|---|---|---|---|
| DE | 10332363 A1 | | 12/2004 | |

(Continued)

OTHER PUBLICATIONS

European Search Report issued in counterpart European Patent Application No. 18176560.3, dated Nov. 7, 2018 (6 pages).

*Primary Examiner* — Thomas B Will
*Assistant Examiner* — Joan D Misa

(57) ABSTRACT

A chopping blade for a straw chopper comprises a fastening opening, two side faces, and cutting edges arranged on one or both ends of the side faces. At least one of the side faces is equipped with means for reducing the frictional resistance of the chopping blade relative to the air and/or the chopping material.

9 Claims, 2 Drawing Sheets

(56) References Cited

U.S. PATENT DOCUMENTS

| | | | | |
|---|---|---|---|---|
| 3,636,685 | A * | 1/1972 | Speckman | A01D 34/73 56/295 |
| 4,254,607 | A * | 3/1981 | Moore | A01D 34/73 56/295 |
| 4,765,127 | A * | 8/1988 | Hamblen | A01D 34/73 30/276 |
| 4,998,679 | A * | 3/1991 | Bender | A01F 12/40 241/243 |
| 5,042,973 | A * | 8/1991 | Hammarstrand | A01F 12/40 460/112 |
| 5,272,861 | A * | 12/1993 | Roynberg | A01B 33/144 172/91 |
| 5,321,940 | A * | 6/1994 | Peterson | A01D 34/73 56/255 |
| 5,394,612 | A * | 3/1995 | Wolfington | A01D 34/73 30/276 |
| D358,535 | S * | 5/1995 | Skinner | D15/138 |
| 5,430,943 | A * | 7/1995 | Lee | A01D 34/4168 30/276 |
| D364,079 | S * | 11/1995 | Skinner | D15/138 |
| 5,482,508 | A | 1/1996 | Redekop et al. | |
| D379,052 | S * | 5/1997 | Skinner | D15/138 |
| D379,419 | S * | 5/1997 | Skinner | D8/8 |
| 5,761,892 | A * | 6/1998 | Quiroga | A01D 34/73 56/17.5 |
| 5,887,349 | A * | 3/1999 | Walden | A01D 34/736 30/276 |
| 5,996,233 | A * | 12/1999 | Morabit | A01D 34/4168 30/276 |
| 6,045,911 | A * | 4/2000 | Legrand | A01D 34/4168 30/276 |
| 6,314,848 | B2 * | 11/2001 | Morabit | A01D 34/4168 30/276 |
| 6,427,341 | B1 * | 8/2002 | Lee | A01D 34/4168 30/276 |
| 6,655,119 | B2 * | 12/2003 | Hasei | A01D 34/73 56/255 |
| 6,829,879 | B2 * | 12/2004 | Weichholdt | A01F 12/40 460/112 |
| 6,953,398 | B1 * | 10/2005 | Turner | A01D 34/535 460/112 |
| 7,104,883 | B2 * | 9/2006 | Dow | A01F 12/40 460/112 |
| 7,210,231 | B2 * | 5/2007 | Legrand | A01D 34/4168 30/276 |
| 7,297,053 | B2 * | 11/2007 | Farley | A01D 41/1252 460/112 |
| 7,299,612 | B2 * | 11/2007 | Schuyler | A01D 34/73 56/255 |
| 7,392,643 | B2 * | 7/2008 | Warashina | A01D 34/005 56/17.5 |
| 7,555,889 | B2 * | 7/2009 | Priesnitz | A01F 12/40 56/504 |
| 7,988,080 | B2 * | 8/2011 | Benes | A01F 12/40 241/242 |
| 8,298,058 | B2 * | 10/2012 | Lauer | A01F 12/40 460/112 |
| 8,615,977 | B2 * | 12/2013 | Campione | A01D 34/73 56/295 |
| 9,003,754 | B1 * | 4/2015 | Fogle, III | A01D 34/005 56/295 |
| 9,095,091 | B1 * | 8/2015 | Fogle | A01D 34/005 |
| D759,126 | S * | 6/2016 | Johnson | A01D 34/736 D15/17 |
| D767,639 | S * | 9/2016 | Johnson | D15/17 |
| D768,727 | S * | 10/2016 | Johnson | D15/17 |
| D781,927 | S * | 3/2017 | Craven | D15/17 |
| D837,266 | S * | 1/2019 | Wong | D15/17 |
| D837,267 | S * | 1/2019 | Wong | D15/17 |
| D837,268 | S * | 1/2019 | Burrows | D15/17 |
| 10,194,584 | B2 * | 2/2019 | Gunther | A01D 34/733 |
| D873,302 | S * | 1/2020 | Southwell | D15/17 |
| 2005/0230510 | A1 * | 10/2005 | Flanhardt | B21D 53/647 241/242 |
| 2013/0247531 | A1 * | 9/2013 | Campione | A01D 34/005 56/295 |
| 2014/0123503 | A1 * | 5/2014 | Tomita | A01D 34/90 30/347 |

FOREIGN PATENT DOCUMENTS

| | | | | |
|---|---|---|---|---|
| EP | 0457122 | A2 | 11/1991 | |
| EP | 1491084 | A1 | 12/2004 | |
| EP | 1588786 | A1 | 10/2005 | |
| FR | 2627943 | A1 * | 9/1989 | A01D 34/736 |
| WO | 2012162352 | A1 | 11/2012 | |
| WO | WO-2012162352 | A1 * | 11/2012 | A01D 34/73 |

* cited by examiner

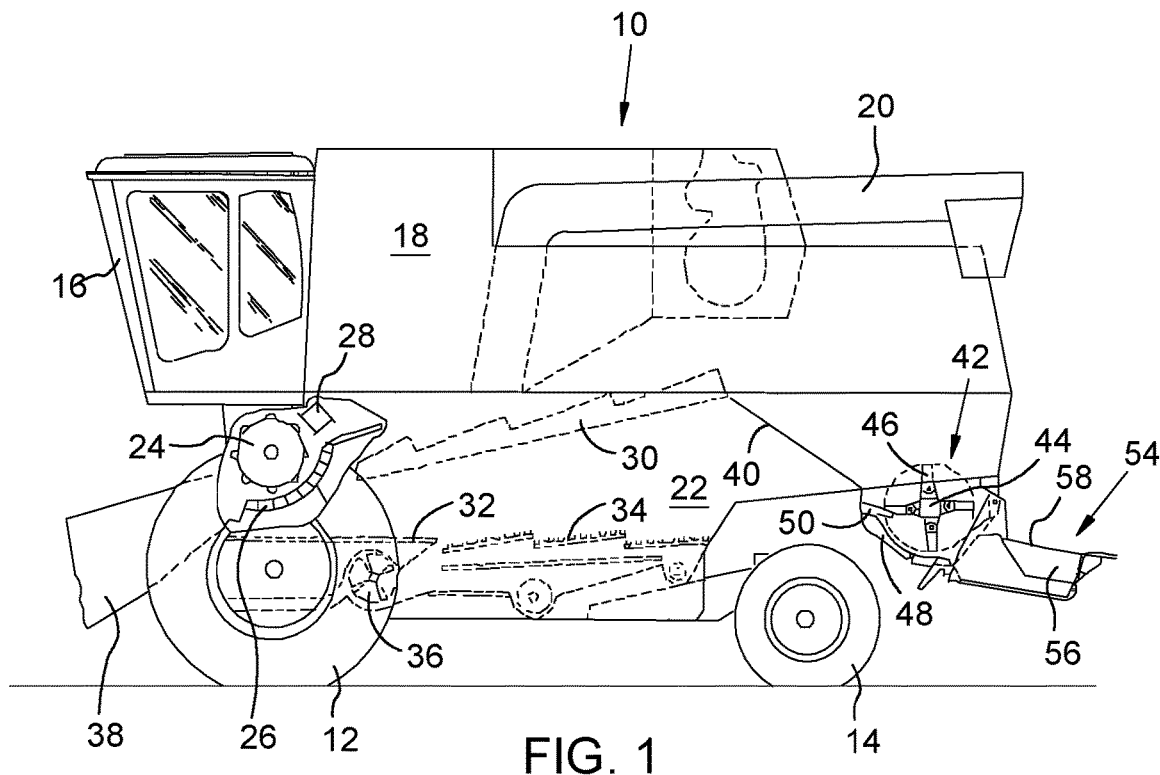
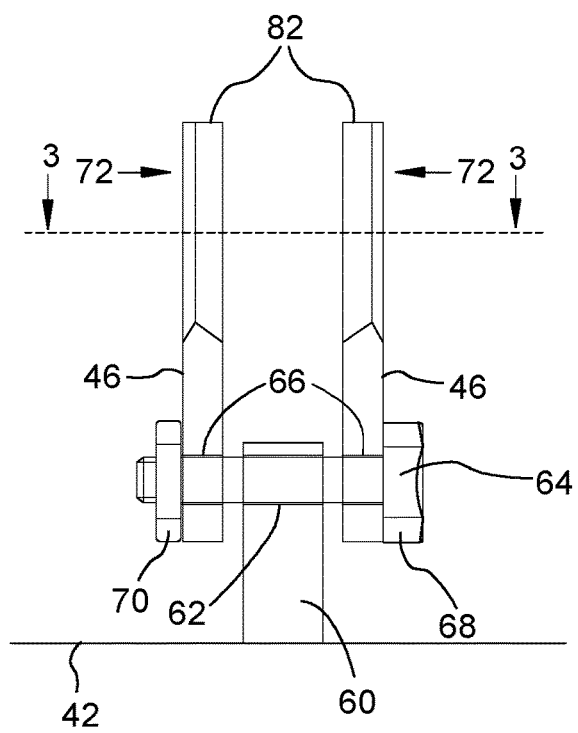
FIG. 2
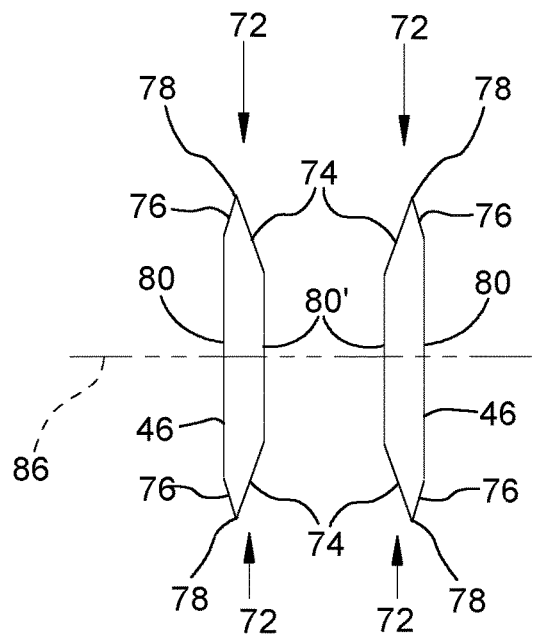
FIG. 3

CHOPPING BLADE FOR A STRAW CHOPPER

FIELD OF THE INVENTION

The invention relates to a chopping blade for a straw chopper, comprising a fastening opening for receiving a fastening element for suspended mounting of the chopping blade on a rotor of the straw chopper, two side faces, and cutting edges arranged at one or both ends of the side faces, and further relates to a straw chopper equipped therewith and to a combine harvester.

BACKGROUND OF THE INVENTION

Combine harvesters are used for harvesting stalky plants, which are cut down from a field and threshed and separated in order to separate out the grain portion of the plants. The grain is cleaned and collected in a grain tank for transfer to a transport vehicle. The crop residues, i.e. the straw of the plants, are either deposited as a swath on the field or comminuted by a straw chopper and distributed on the field across the width of the harvesting head.

Commonly used straw choppers comprise a housing having a counter blade and a rotatable rotor arranged therein. Chopping blades are arranged suspended in pairs on brackets welded onto the rotor and are ground on one or both sides at least on the leading edges and thus are provided with a beveled surface forming a (straight or serrated) edge (DE 103 32 363 A1, EP 1 588 786 A1). These chopping blades per se are flat. A chopping blade of this kind, which is flat per se and has a matte surface and a step arranged crosswise between the cutting edges, is also shown in a brochure "Radura Straw Paddlemesser" from the Rasspe company (without printing information) that was distributed at the Agritechnica 2011 trade show in Hannover, Germany.

EP 0 457 122 A2 proposes to equip the side faces of the flat chopping blades between the cutting edges with sharp-edged elevations, which can be implemented with surfaces roughened by stamping, knurling, milling or the like. These elevations are intended to be used to tear open the stalks of the chopped material in the longitudinal direction so that it can more easily decompose.

There are also so-called paddle blades for straw choppers (EP 1 491 084 A1) that are furnished with surfaces angled relative to the plane of the chopping blades and are intended to convey larger quantities of air through the straw chopper in order to improve the distribution of the crop residues on the field and/or the venting of the cleaning unit.

Since the energy requirement for the chopper also depends on the aerodynamics of the chopping blade, it would be desirable (to the extent that no special air conveyance by means of paddle blades is necessary) to design the chopping blades to be as aerodynamically favorable as possible. The inherently flat chopping blades according to DE 103 32 363 A1, EP 1 588 786 A1 and the brochure from the Rasspe company comprise more or less smooth lateral surfaces on which turbulence that is aerodynamically unfavorable can form. The roughened surfaces of the chopping blades according to EP 0 457 122 A1 also produce such undesired turbulence.

The problem addressed by the invention can be considered that of providing a chopping blade for a straw chopper, a straw chopper and a combine harvester, wherein the chopping blade is characterized by a low coefficient of friction relative to the air and/or the chopping material.

SUMMARY OF THE INVENTION

In accordance with a first aspect of the invention, a chopping blade for a straw chopper comprises a fastening opening for receiving a fastening element for suspended mounting of the chopping blade on a rotor of the straw chopper, two side faces, and cutting edges arranged at one or both ends of the side faces. At least one of the side faces is equipped with means for reducing the frictional resistance of the chopping blade relative to the air and/or the chopping material.

The means for reducing the frictional resistance can comprise one or more holes in the form of through holes or blind holes extending transversely to the side faces. The cross-section of the holes can be circular or oval or angular, or the holes can be slot-like. The longer axis of the holes can extend between the cutting edges or transversely thereto or in any desired intermediate direction.

In accordance with another aspect of the invention, a chopping blade for a straw chopper is provided, having a fastening opening for receiving a fastening element for freely suspended attachment of the chopping blade to a rotor of the straw chopper, two side faces, and cutting edges arranged on one or both ends of the side faces, characterized in that at least one of the side faces is provided with means for reducing the frictional resistance of the chopping blade relative to the air and/or the chopping material.

The means for reducing the frictional resistance may comprise one or more holes in the form of through-holes or blind holes extending transversely to the side faces.

The cross section of the holes may be circular, oval or polygonal.

The means for reducing the air resistance of the chopping blade may comprise a frictional resistance-reducing texture.

The texture may be formed by steps running parallel to the cutting edges, or by waves having recesses and elevations running parallel to the cutting edges or by successive recesses and elevations running along both directions defined by the plane of the side faces.

The steps may be formed by superimposed layers of the chopping blade having different dimensions.

In accordance with another aspect of the invention, a straw chopper is provided having a housing and a drivably and rotatably arranged rotor therein on which chopping blades according to claim 1 are mounted.

In accordance to another aspect of the invention, A combine harvester is provided having a frame supported on wheels and the straw chopper.

The means for reducing the air resistance of the chopping blade can have a frictional resistance-reducing texture, which can be formed by (blunt) elevations and recesses therebetween that extend parallel to the cutting edges or run in alternating directions on the side faces. The texture can also be formed by steps running parallel to the cutting edges. The steps can be formed by superimposed layers of the chopping blade having different dimensions.

BRIEF DESCRIPTION OF THE DRAWINGS

FIG. 1 shows a schematic side view of a combine harvester having a straw chopper.

FIG. 2 shows a side view of the rotor of the straw chopper with a pair of chopping blades suspended thereon.

FIG. 3 shows a cross section through the chopping blade along the line 3-3 in FIG. 2.

DETAILED DESCRIPTION OF THE PREFERRED EMBODIMENTS

Figure 4:
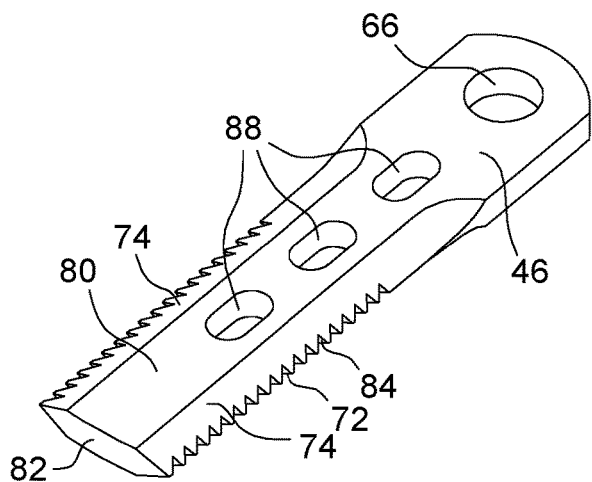
FIG. 4 shows a perspective view of a first embodiment of a chopping blade.

A harvesting machine 10 in the form of a combine harvester as shown in FIG. 1 is supported on front driven and rear steerable wheels 12 and 14, respectively, and has a driver's cab 16 from which it can be operated by a driver. The cab 16 is adjoined at the rear by a grain tank 18, which can transfer product deposited therein to the outside via a discharge tube 20. The grain tank 18 is supported on a frame 22, in which supplied material is separated into large and small components on a path through a threshing drum 24, a threshing basket 26 and a turning drum 28. On the adjoining straw walkers 30, and on a preparation floor 32 and sieves 34, a further separation of the harvested material is carried out, wherein the threshed portion of the material is conveyed into the grain tank 18, the large crop parts are supplied via the straw walkers 30 to a straw chopper 42 by means of a straw guiding plate 40, and the light components are blown out by means of a fan 36 from the sieves 34 or are likewise blown onto the ground, via additional chaff spreaders or by the straw chopper 42. Material lying or standing on the ground is picked up from the ground by a crop retrieval device, not shown, and supplied via an inclined conveyor 38 and a stone trap to the threshing drum 24. The tangential threshing mechanism shown, with the threshing drum 24 and the threshing basket 26 and the downstream straw walker 30, is only one possible embodiment, which could be supplemented or replaced by an axial threshing and/or separating rotor.

The straw chopper 42 comprises a hollow cylindrical rotor 44, which has freely suspended chopping blades 46 distributed about the circumference and length thereof and is connected to a drive unit in such a manner that it rotates in a housing 48 about an axis that runs approximately horizontally and transverse to the travel direction. In cooperation with counter blades 50, the threshed large crop parts are comminuted into chopped material. At the rear side of the straw chopper 42, a distributing device 54 is arranged, having a plurality of guiding devices 56 in the form of straw guide plates arranged laterally one next to another underneath a straw distributor hood 58. The guiding devices 56 can be replaced by driven straw distributor plates.

Referring to FIG. 2, the chopping knives 46 are seated freely suspended in pairs on mountings 60, which are attached to the rotor 44. The mountings 60 each have bores 62 extending in the axial direction of the rotor 44, through each of which holes a respective bolt 64 extends. The bolt 64 also extends through fastening openings 66 formed at the end in the chopping knives 46 and the bolt is fixed by a nut 70 at the end opposite a head 68 thereof. The diameters of the bore 62 and the fastening openings 66 are selected such that the chopping blades 46 can swing freely.

Figure 5:
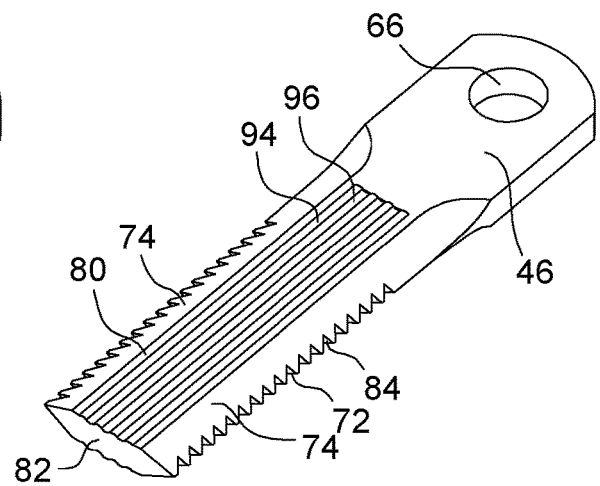
FIG. 5 shows a perspective view of a second embodiment of a chopping blade.
Figure 6:
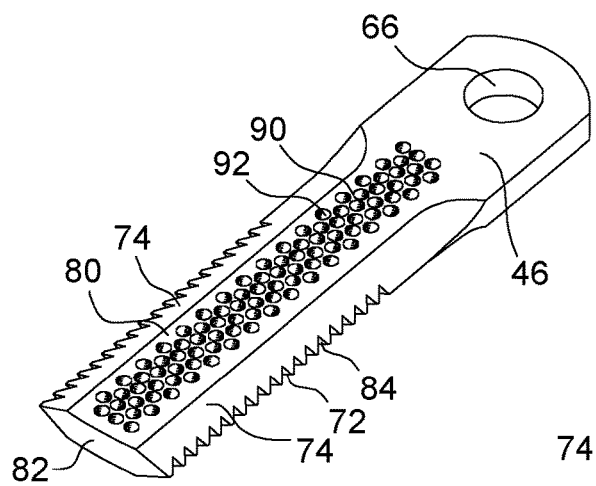
FIG. 6 shows a perspective view of a third embodiment of a chopping blade.

Viewed overall, the chopping blades 46 are formed as shallow cuboids, the longer sides of which extend from the fastening opening 66 in the position when mounted on the rotor 44 radially outward in operation up to an outer end 82. At the leading and trailing end faces in the rotational direction of the rotor 44, the chopping blades 46 are provided with cutting edges 72 in the areas facing away from the rotor 44, which extend in the embodiment shown over approximately 60% of the length of the chopping blades 46, as shown in FIGS. 4-6. Between the cutting edges 72, the chopping blades 46 form flat side faces 80 (illustrated herein as two opposing side faces 80, 80 for each chopping blade). The cutting edges 72 are formed by oblique faces 74, which can be provided with serrations 84, which can also be omitted. The oblique faces 74 can each be provided on only one of the side faces 80 (as in FIG. 7) or on both side faces 80 (as shown in FIGS. 2-6), wherein it is immaterial whether the beveled faces 74 are arranged on the same or on opposing side faces 80, and whether the beveled side faces 74 jointly form a cutting edge 72 symmetrically to the longitudinal center plane of the chopping blade 46 or not.

In the embodiment according to FIG. 4, plural throughholes 88 are provided in the side face 80. These holes 88 have elongated cross-sections with circular ends, although they could also be formed as circles, ovals, triangles, rectangles or polygons or as a slot with any desired orientation in the plane of the side faces 80. They also can be constructed as blind holes. The holes 88 firstly reduce the mass of the chopping blades 46 and secondly reduce the frictional resistance of the chopping blades 46 to the air and the chopping material, which cannot adhere to the areas of the chopping blades formed by the holes 88.

In the embodiment according to FIG. 5, the side faces 80 are equipped on both sides with respectively adjacent, wave-like elevations 94 and recesses 96, which extend parallel to the cutting edges 72. The elevations 94 and recesses 96 likewise reduce the friction resistance of the chopping blades 46 to air and the chopping material. The elevations 94 and recesses 96 can be produced by plastic deformation of the blanks for the chopping blades 46, by milling or by means of a press and a punch, whether before or after or jointly with the (rough) forming of the cutting edges 72, which is generally followed by a grinding process and optionally heat treatment and/or hardening. Due to the formation of the elevations 94 and recesses 96, the elevations 94 can protrude above the plane of the regions of the side faces 80 not provided with elevations 94 and recesses 96.

In the embodiment according to FIG. 6, the side faces 80 are equipped on both sides with respectively adjacent elevations 90 and recesses 92 in both directions defined by the plane of the side faces 80, similarly to a golf ball. The elevations 90 and recesses 92 likewise reduce the friction resistance of the chopping blades 46 to air and the chopping material. The elevations 90 and recesses 92 can likewise be produced by plastic deformation of the blanks for the chopping blades 46 by means of a press and a punch, whether before or after or jointly with the (rough) forming of the cutting edges 72, which is generally followed by a grinding process and optionally heat treatment and/or hardening. Due to the formation of the elevations 90 and recesses 92, the elevations 90 can protrude above the plane of the regions of the side faces 80 not provided with elevations 90 and recesses 96.

Figure 7:
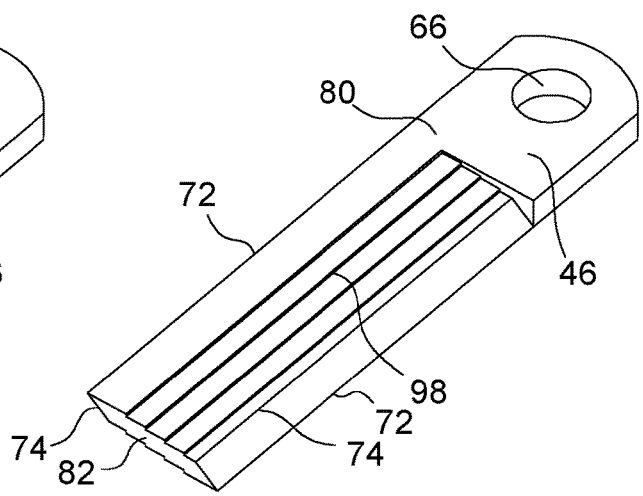
FIG. 7 shows a perspective view of a fourth embodiment of a chopping blade.

In the embodiment according to FIG. 7, the side faces 80 are equipped on both sides with small steps 98 parallel to the cutting edges 72, similarly to a Japanese knife. The steps 98 likewise reduce the frictional resistance of the chopping blades 46 to the air and the chopping material. They can be produced by superimposed layers of the chopping blade 46 with different dimensions, or milled into the side faces 80 or produced by plastic deformation of the blanks for the chopping blades 46 by means of a press and a punch, whether before, after or jointly with the (rough) shaping of the cutting edges 72, which is generally followed by a grinding process and optionally heat treatment and/or hardening. In the embodiment according to FIG. 7, the beveled faces are formed only on one side face 80, (i.e. not on both side faces as in FIGS. 4-6, although the latter arrangement would be possible in the embodiment according to FIG. 7).

The invention claimed is:

1. A chopping blade for a straw chopper, comprising a fastening opening for receiving a fastening element for freely suspended attachment of the chopping blade to a rotor of the straw chopper, two side faces that are flat and parallel to each other, and cutting edges arranged on one or both ends of the side faces, and at least one of the side faces provided with means for reducing frictional resistance of the chopping blade relative to the air or material being chopped; wherein the means for reducing frictional resistance of the chopping blade comprise a frictional resistance-reducing texture, and the texture is formed by successive recesses and elevations running along both directions defined by the plane of the at least one of the side faces, the frictional resistance-reducing texture includes multiple frictional resistance-reducing rows aligned parallel to one another, each frictional resistance-reducing row comprises multiple frictional resistance-reducing units, and each recess and elevation forms one of the frictional resistance-reducing units.

2. The chopping blade according to claim 1, wherein the frictional resistance-reducing units of one of the frictional resistance-reducing rows include the elevations followed by the respective recesses, and the frictional resistance-reducing units of an adjacent frictional resistance-reducing row of the frictional resistance-reducing rows include the recesses followed by the respective elevations.

3. The chopping blade according to claim 1, wherein the means for reducing frictional resistance of the chopping blade comprise a frictional resistance-reducing texture wherein an arrangement of the elevations and recesses of the frictional resistance-reducing units of one of the frictional resistance-reducing rows and another arrangement of the elevations and recesses of the frictional resistance-reducing units of another one of the frictional resistance-reducing rows are staggered.

4. A straw chopper comprising a housing and a drivably and rotatably arranged rotor therein on which chopping blades according to claim 1 are mounted.

5. A combine harvester comprising a frame supported on wheels and a straw chopper according to claim 4.

6. A chopping blade for a straw chopper, comprising a fastening opening for receiving a fastening element for freely suspended attachment of the chopping blade to a rotor of the straw chopper, two side faces, and a cutting edge arranged on one end of the side faces, at least one of the side faces is provided with a frictional resistance-reducing texture for reducing frictional resistance of the chopping blade relative to the air or material being chopped; and wherein the texture is formed by steps running parallel to the cutting edges and the steps are formed by superimposed layers of the chopping blade, each step includes a beveled surface, the beveled surface of the last step adjacent to the one end forms the cutting edge.

7. The chopping blade for a straw chopper of claim 6, wherein the thickness of the superimposed layers is decreasing toward the cutting edges.

8. The chopping blade for a straw chopper of claim 6, wherein the last step of the beveled surface of the last step is wider than the beveled surfaces of other steps and extends to form the cutting edge.

9. The chopping blade for a straw chopper of claim 6, wherein the beveled surfaces of the steps are part of the frictional resistance-reducing texture for reducing frictional resistance of the chopping blade.

* * * * *